E. EINFELDT.
METHOD OF MAKING WHEEL TIRES.
APPLICATION FILED JULY 9, 1909. RENEWED AUG. 16, 1911.
1,092,477.
Patented Apr. 7, 1914.
2 SHEETS—SHEET 1.
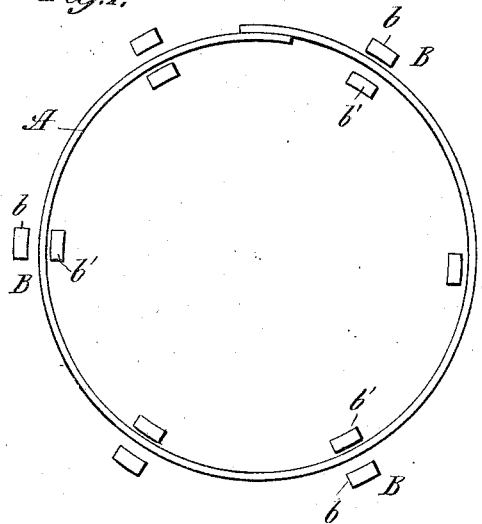
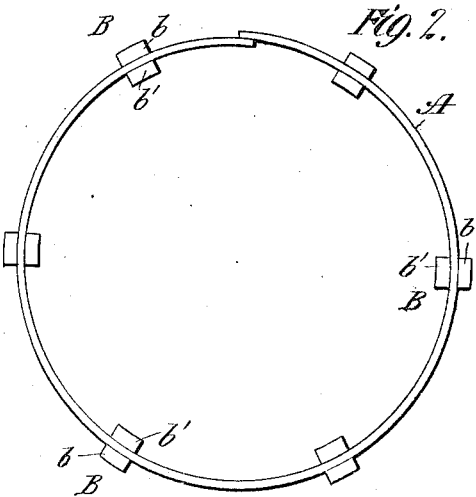
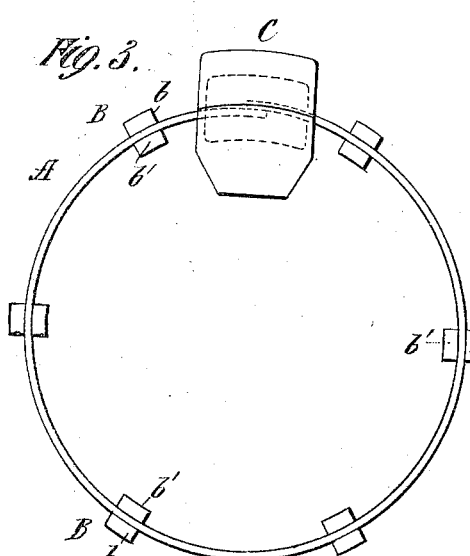
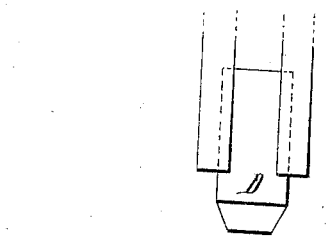
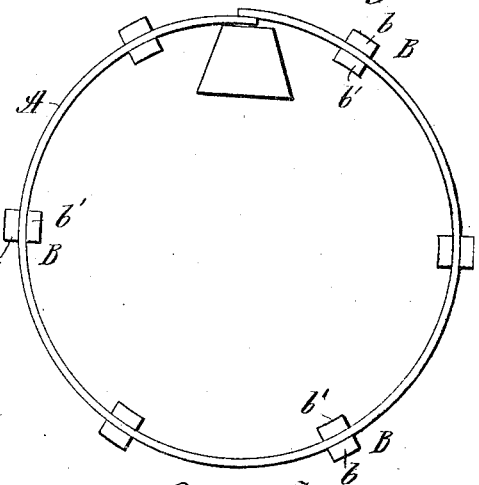
Witnesses:
Inventor
Emil Einfeldt
By his Attorney
P. T. Dodge E. EINFELDT.
METHOD OF MAKING WHEEL TIRES.
APPLICATION FILED JULY 9, 1909. RENEWED AUG. 16, 1911.
1,092,477.
Patented Apr. 7, 1914.
2 SHEETS—SHEET 2.
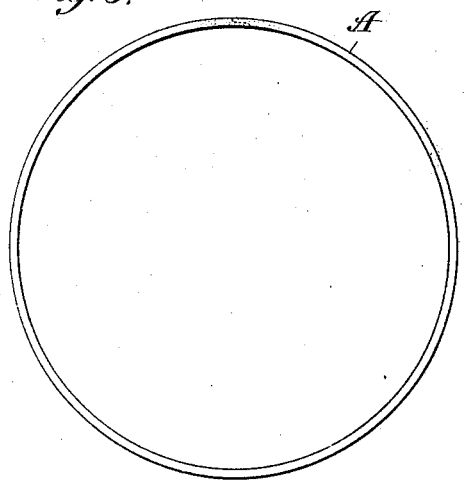
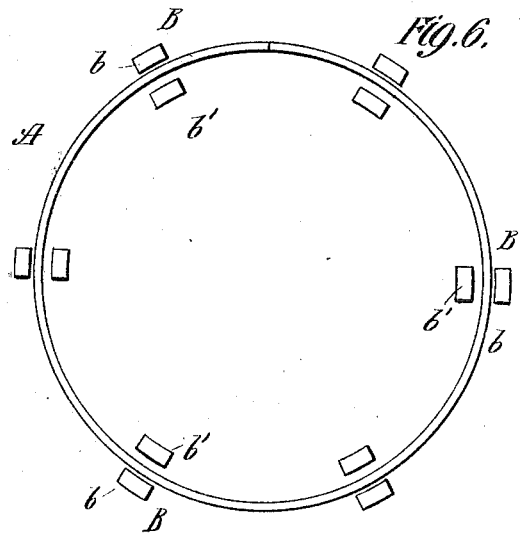
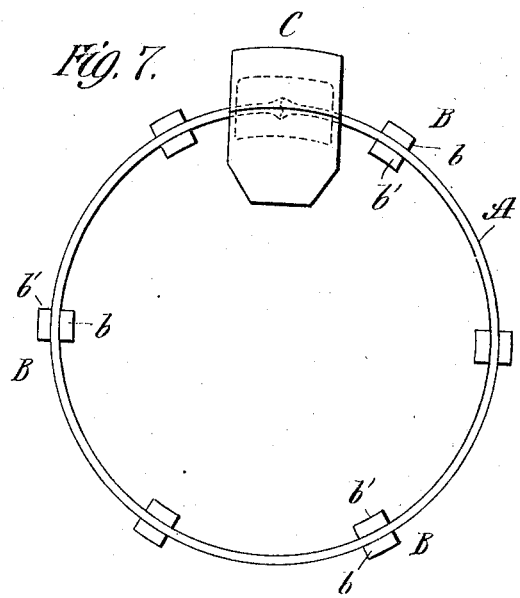
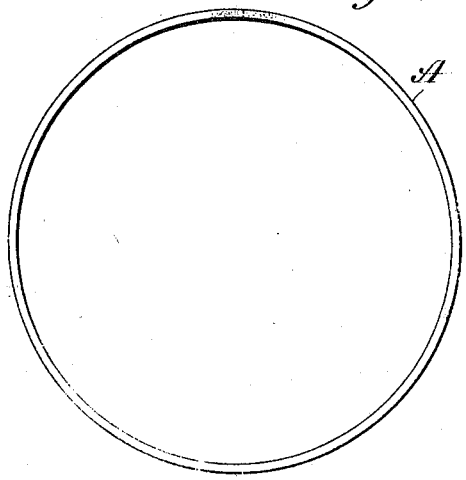

UNITED STATES PATENT OFFICE.

EMIL EINFELDT, OF DAVENPORT, IOWA, ASSIGNOR, BY MESNE ASSIGNMENTS, TO G. WATSON FRENCH, NATHANIEL FRENCH, AND JOSEPH L. HECHT, ALL OF DAVENPORT, IOWA, A FIRM.

METHOD OF MAKING WHEEL-TIRES.

1,092,477.   Specification of Letters Patent.   Patented Apr. 7, 1914.

Application filed July 9, 1909, Serial No. 506,706. Renewed August 16, 1911. Serial No. 644,415.

*To all whom it may concern:*

Be it known that I, EMIL EINFELDT, of Davenport, county of Scott, and State of Iowa, have invented a new and useful Improvement in Methods of Making Wheel-Tires, of which the following is a specification.

This invention consists of an improved method of making metal wheel tires, the object being to produce tires of true circular form and of the exact predetermined size desired, and this without regard to any variations or irregularities that may exist in the tire material or the welded connection of the tire ends.

With this end in view, my improved method consists in providing a tire strip or blank of the general circular form of the tire, with its ends disconnected; heating the ends; forcing the tire into a true circle of the required predetermined diameter; and welding the ends of the tire.

The mechanism for carrying the method into effect may be of different forms and constructions, that illustrated in the accompanying drawings, operating to subject the tire blank in its disconnected unfinished condition and at a plurality of points in its circumference, to radial pressure, acting either to expand or contract the same, according as to whether the bent blank is smaller or larger than the finished tire, and in this manner forcing the tire into true circular form of a definite and predetermined size, in which condition the weld between the ends of the tire is formed. The mechanism acts further to clamp the tire at the several points in its circumference, and when the latter has been forced to its final size and shape, it may be held in this condition until the weld cools, thereby preventing any deformation, drawing-out of the weld, or other departure from the true circular form or required diameter. By this method of procedure, successive welded tires may be produced all of the same true circular form and all of the same uniform diameter.

In the accompanying drawings:—Figure 1 represents a tire blank bent into general circular form and smaller than the finished tire, with its ends overlapping to produce a lap-weld. Fig. 2 is a view showing said blank acted on by the pressure clamps and expanded to its final predetermined size. Fig. 3 is a similar view showing how the ends of the tire are heated. Fig. 4 is a view showing how the heated ends are welded together. Fig. 5 is a view of the finished tire lap-welded. Fig. 6 represents a view of a tire blank bent into circular form with its ends abutting so as to produce a butt-weld, and greater in diameter than the finished tire. Fig. 7 is a view showing the means for heating the abutting ends of the tire, and the latter clamped and reduced in size so as to form the weld. Fig. 8 is a view of the finished tire butt-welded.

Referring to Figs. 1, 2, 3, 4 and 5, which illustrate the steps of my improved method in producing a tire with its ends connected by a lap-weld, I first, in carrying this method into effect, provide a tire blank A, which is bent as shown into general circular form and has its ends overlapping, the diameter of the bent blank in this case being less than that of the final finished tire. This tire is acted on at a number of points by means of clamping devices B, comprising each, jaws $b$, $b'$ adapted to grasp the tire blank on the inside and outside, and so sustained and actuated that when the jaws close, they will meet at points intersecting a true circular line drawn from a central point. As a result of this action, when the jaws close on the open ended tire, they will act to bring or bend or spring the same to a predetermined fixed point, so that there can be no variation in the size of the tires or irregularity in their form. Any appropriate means by which these actions of the jaws are effected, may be resorted to, as they in themselves form no part of the present invention. The tire blank with its ends disconnected and held at different points in its circumference is now subjected at the point where the ends overlap, to heat, so as to soften these ends for the purpose of effecting the weld. As shown in Fig. 3, the heat is applied by means of a muffle-furnace C, into which the heating-flame is introduced in any suitable manner. When the ends have become sufficiently heated to permit their welding, the tire is removed from the furnace and the overlapping heated ends welded by any appropriate means, Fig. 4 showing this action as being performed by a welding hammer D. After the weld has in this manner been effected, the connected tire is held by the clamping devices for a time sufficient to allow the metal to cool, whereby its true circular form will be preserved and any change in diameter, due to the drawing-out of the weld or to other causes, will be obviated.

Figs. 6, 7 and 8 illustrate the steps of my improved method where a butt-weld is formed between the tire ends. In carrying out my method where the weld is of this character, a tire blank is provided which, when bent into general circular form with its ends abutting as shown in Fig. 6, will be slightly greater in diameter than that of the finished tire. This figure shows the blank in this condition with the clamps applied and opened. The abutting ends of the tire are next heated, as by the muffle-furnace (Fig. 7), and when they have been sufficiently heated to become soft enough for welding, the clamps are closed on the tire, and engaging the same at a number of points in its circumference, they will act, as in the first case described, to bring the tire to its final predetermined circular form, the action in this case being to reduce the diameter of the tire and resulting in the forcing of the heated ends into each other and their upsetting to form a weld. The clamps, as in the first case described, are held closed on the tire so as to hold it until the weld cools, after which the tire is removed and the weld subjected, if necessary, to a hammering or finishing operation to smooth down any projections or enlargements.

From the foregoing description it will be seen that the tire blank in its disconnected and unfinished condition is subjected at a number of points in its circumference to radial pressure, in the one case as in Figs. 1, 2, 3 and 4, enlarging the diameter to bring it to final size; and in the other case, as represented in Figs. 6 and 7, reducing the diameter of the blank to bring it to final size. As a result of this action, the successive tires, after they have been welded, will all be of the same shape and diameter, so that there will be no irregularity or non-uniformity in the successive products.

Having thus described my invention, what I claim is:—

1. The method of making tires, which consists in providing a tire strip or blank of the general form of the tire with its ends disconnected, holding the blank in true circular form of the required predetermined diameter, and welding the ends of the same while so held.

2. The method of making tires, which consists in providing a tire strip or blank of the general form of the tire with its ends disconnected, holding said blank in true circular form of the required predetermined diameter, welding the ends of the blank, and maintaining said hold thereon until the tire cools.

3. The method of making tires, which consists in providing a tire strip or blank of the general form of the tire with its ends disconnected, forcing the blank into a true circle of the required predetermined diameter, holding the same, and welding the ends of the blank while so held.

4. The method of making tires, which consists in providing a tire strip or blank of the general form of the tire with its ends overlapping and disconnected, forcing the blank into true circular form of the required diameter, and welding the ends of the same together.

5. The method of making tires, which consists in providing a tire strip or blank of the general form of the tire and with its ends disconnected, forcing the blank into a true circle of the required predetermined diameter and holding the same, and then welding the ends of the blank while so held.

In testimony whereof I hereunto set my hand this 26th day of June, 1909, in the presence of two attesting witnesses.

EMIL EINFELDT.

Witnesses:
ANDREW NEILSON,
SARAH NEILSON.